United States Patent Office 3,490,028
Patented Jan. 13, 1970

3,490,028
POWER SUPPLY ENERGY TRANSFORMATION APPARATUS
Victor J. Modiano, Anaheim, Calif., assignor to Hughes Aircraft Company, Culver City, Calif., a corporation of Delaware
Filed July 24, 1968, Ser. No. 747,235
Int. Cl. H02m 5/40
U.S. Cl. 321—2                                      6 Claims

ABSTRACT OF THE DISCLOSURE

The apparatus of the present invention provides a high energy transfer to weight ratio system for permitting the transformation of direct-current energy while minimizing losses and preventing breakdown voltages from occurring. In addition, the apparatus does not require the utilization of a relatively heavy input line transformer to reduce the AC voltage prior to rectification to decrease maximum voltage across the switches to below the breakdown voltages thereof. The apparatus utilizes series-parallel switching in a manner to achieve minimum voltage across the respective switches upon opening, the voltage being that due only to the output voltage with consequent less losses due to imperfect switching. Smaller losses in the switches permits higher frequency operation, with concomitant smaller transformers and capacitors.

BACKGROUND OF THE INVENTION

In contemporary systems, rectified electrical energy is applied across the primary of a transformer and the connection controllably broken at a later time to release the magnetic energy therein to an output load. The rate at which the primary connection is opened may be determined in a manner to regulate the output voltage. The energy transfer to weight ratio of this type of apparatus generally is not satisfactory as these systems are inefficient and develop large transient voltages. This inefficiency is due in part to imperfect switching which is controlled by the use of relatively heavy input line transformers to reduce the AC voltage prior to rectification.

SUMMARY OF THE INVENTION

In accordance with the present invention, a plurality of capacitors are connected across the respective individually-switched serially connected primary windings of a corresponding plurality of transformers. The serially-connected primary windings are, in turn, connected across a source of direct-current voltage which need not be filtered. The output from a secondary winding of each transformer is applied across a common load impedance. In operation, the switches in series with the respective primary windings of the plurality of transformers are closed in unchanging order with a duty factor determined by the output voltage. The closing of a switch allows a capacitor to discharge through its associated primary winding. This discharge builds up the energy in a magnetic circuit which also links the secondary winding of the transformer. When the discharge is complete, the switch is opened and the energy in the transformer is transferred to the load circuit by means of the collapse of the magnetic field linking the secondary winding. Control circuitry is employed to prevent a successive switch from being closed until the discharge of a capacitor through its associated primary winding is complete. The transfer of energy of a magnetic field linking a secondary winding to the output circuit does not occur concurrently with discharge of a capacitor through its corresponding primary winding.

DESCRIPTION

Figure 1:
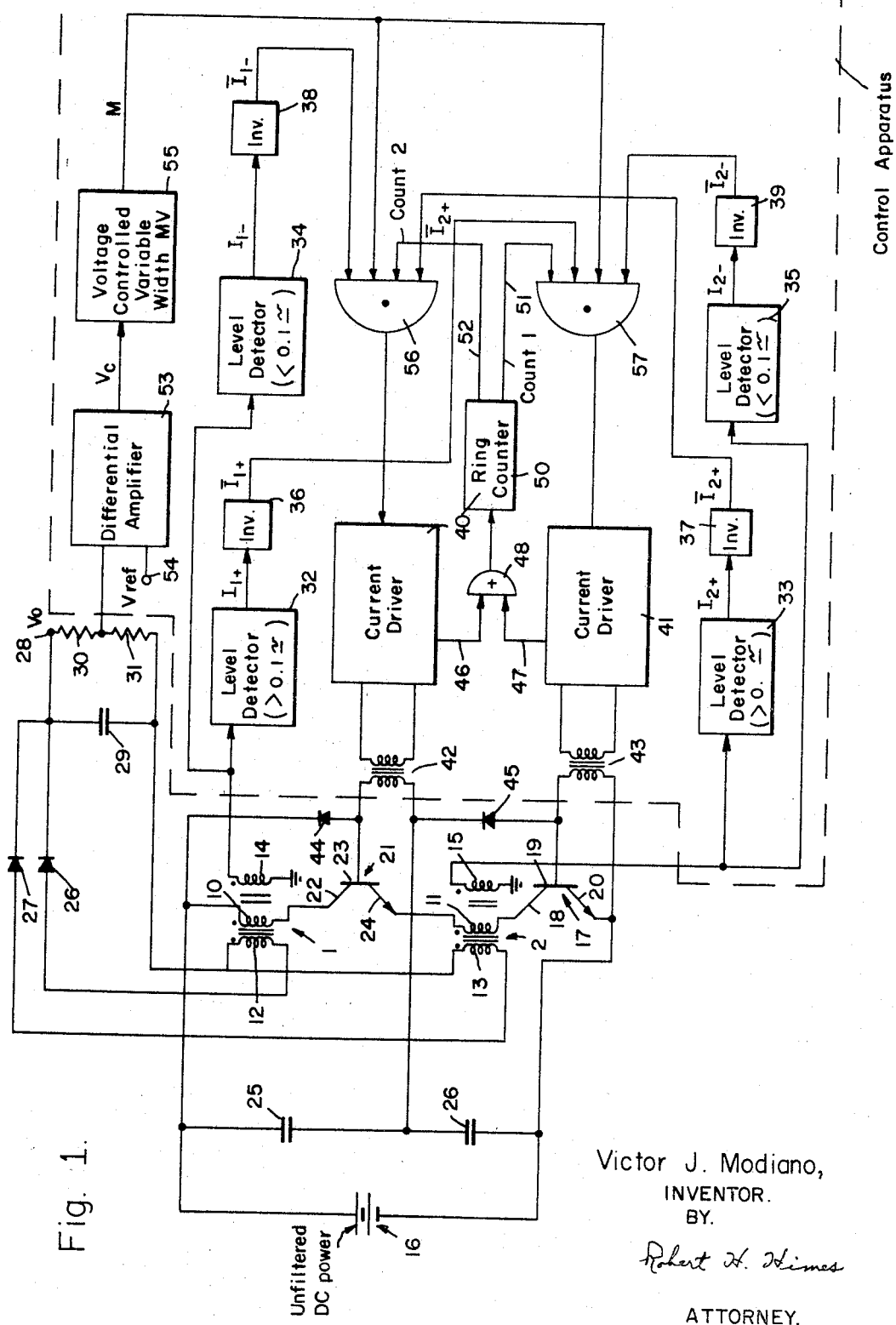
FIG. 1 shows a combination schematic circuit and block diagram of an embodiment of the invention wherein two transformers are series-parallel connected.

In describing the apparatus of the present invention, a convention is employed in the drawings wherein individual "and" and "or" gates are shown as semicircular blocks with the inputs applied to the straight side and the output appearing on the semicircular side. An "and" gate is indicated by a dot ($\cdot$) and an "or" gate by a plus ($+$) in the semi-circular block. As is generally known, an "and" gate produces a "one" or information level output signal only when every input is at the information level, i.e., the output signal is the "conjunction" of the input signal. An "or" gate, on the other hand, produces an information level output signal when any one of the input signals applied thereto is at the information level, i.e., the output signal is the "alternation" of the input signals. Lastly, a convention is employed wherein the complement of a signal is designated with a straight line drawn thereover and the subscripts of respective characters identify the transformer to which the characters relate.

Referring now to FIG. 1 of the drawings wherein there is shown an embodiment of the power supply of the present invention which includes transformers 1 and 2 having primary windings 10, 11 respectively; secondary windings 12, 13 respectively; and sense windings 14, 15 respectively. Windings 10, 12, 14 of transformer 1 and windings 11, 13, 15 of transformer 2 are poled in a consistent direction as indicated by the polarity dots in the drawing. For the purposes of the following description, the dot end of the windings 10–15 are referred to as the "positive" ends and the opposite end of the windings are referred to as the "negative" ends. The positive end of winding 10 of the transformer 1 is connected to the positive terminal of an unfiltered DC power source 16. A switching transistor 17 has a collector 18 connected to the negative end of winding 11 of transformer 2, a base 19 and an emitter 20, the emitter 20 being connected to the negative terminal of the DC power source 16. An additional switching transistor 21 has a collector 22 connected to the negative end of winding 10 of transformer 1, a base 23, and an emitter 24 connected to the positive end of winding 11 of transformer 2. Capacitors 25, 26 are serially connected in the order named from the positive to the negative terminal of unfiltered DC power source 16 and the common terminal therebetween connected to the positive end of winding 11 of transformer.

The negative ends of secondary windings 12, 13 are connected through diodes 26, 27, respectively, to an output terminal 28, the diodes 26, 27 both being poled in a direction to allow current to flow towards an output terminal 28. A capacitor 29 is connected in parallel with serially connected resistors 30, 31 to a reference terminal, which reference terminal is, in turn, connected to the negative ends of windings 12, 13. The negative ends of the sense windings 14, 15, on the other hand, are referenced to ground and the positive ends thereof connected, respectively, to level detectors 32, 33 and to level detectors 34, 35. The level detectors 32, 33 are designed to generate an information level output signal at the output thereof when the signal at the input is more positive than 0.1 volt and a zero level signal at all other times. The level detectors 34, 35, on the other hand, generate an information level signal at the output thereof when the signal at the input is less than 0.1 volt and a zero level signal at other times. The output signals $I_{1+}$, $I_{2+}$, $I_{1-}$, $I_{2-}$ from the level detectors 32, 33, 34, 35 are inverted by inverters 36, 37, 38, 39 to provide the signals $\bar{I}_{1+}$, $\bar{I}_{2+}$, $\bar{I}_{1-}$, $\bar{I}_{2-}$, at the respective outputs thereof.

Current drivers 40, 41 control the switching transistors 21, 17, respectively, through transformers 42, 43. In particular, the output winding of transformer 42 is connected from the base 23 to the emitter 24 of transistor 21 and the output winding of transformer 42 is connected from the base 19 to the emitter 20 of transistor 17. In order to assist the cutting off of current flow through transistor 21 at the termination of the discharge of capacitor 25, negative excursions across the winding 10 of transformer 1 are applied to the base 23 of transistor 21 by means of a diode 44 connected therefrom to the positive end of the winding 10. Similarly to cut off current flow through transistor 17 at the termination of the discharge of capacitor 26, negative excursions across the winding 11 of transformer 2 are applied to the base 19 of transistor 17 by means of a diode 45 connected therefrom to the positive end of the winding 11. In addition, current drivers 40, 41 generate information level output pulses on leads 46, 47 respectively which are connected through an "or" gate 48 to the input of a ring counter 50. The cycle of ring counter 50 includes a count position for each of the current drivers 40, 41. In instances where additional transformers 1, 2 with corresponding switching transistors 21, 17 and capacitors 25, 26 are employed, corresponding additional count positions are added to the ring counter 50. In the present case, an information level output pulse appearing on lead 46 from current driver 40 causes ring counter 50 to generate a "count 1" or information level signal, $C_1$, on a lead 51 therefrom and an information level output pulse appearing on lead 47 from current driver 41 causes the ring counter 50 to step the information level signal to a lead 52 which is designated as a "count 2" signal, $C_2$. One output from the ring counter 50 is at all times at the information level.

A differential amplifier 53 receives inputs from the connection between output resistors 30 and 31 and from a reference voltage $V_{REF}$, available at a terminal 54 to generate a control voltage, $V_c$, proportional to the negative deviation of the output voltage $V_o$, from a desired level. The reference voltage, $V_{REF}$, must be referred to the negative end of windings 12 and 13, which could be grounded. The control voltage, $V_c$, is applied to a voltage-controlled variable width multivibrator 55 which generates a signal, M, which remains at information level for successive periods of duration determined by the magnitude of the control voltage, $V_c$, and reverts to zero level at all other times.

Operation of the current drivers, 40, 41, are controlled by connections from the respective outputs of four-input "and" gates 56, 57. "And" gate 56 receives the M signal from variable-width multivibrator 55, the $\bar{I}_{1-}$ signal from inverter 38, the $\bar{I}_{2+}$ signal from inverter 37 and the count 2 signal, $C_2$ from the ring counter 50. "And" gate 57, on the other hand, receives the M signal from the variable width multivibrator 55, the $\bar{I}_{2-}$ signal from the inverter 39, the $\bar{I}_{1+}$ signal from the inverter 36 and the count 1 signal, $C_1$, from ring counter 50.

In the operation of the power supply of the present invention, the DC power source 16 initially charges the capacitors 25, 26 so that the voltage, $V_s$, from source 16 is equally divided thereacross. With no current flowing in transformers 1 and 2, the output voltages from windings 14, 15 thereof are both zero. Thus, the signals $I_{1+}$, $I_{1-}$, $I_{2+}$ and $I_{2-}$ are set at zero level and the complements $\bar{I}_{1+}$, $\bar{I}_{1-}$, $\bar{I}_{2+}$ and $\bar{I}_{2-}$ at information level. Since the output voltage $V_o$ has not yet built up, the control voltage, $V_c$, is at a maximum whereby the signal M is at information level for maximum durations. In addition, assume that the count 2 output, $C_2$, from ring counter 50 is the output therefrom that is initially at information level. Under these circumstances, all the inputs to the "and" gate 56 are at information level when M is at information level, thereby turning on current driver 40 which closes the switching transistor 21. See interval $a$, FIG. 2 for "and" gate 56.

Figure 2:
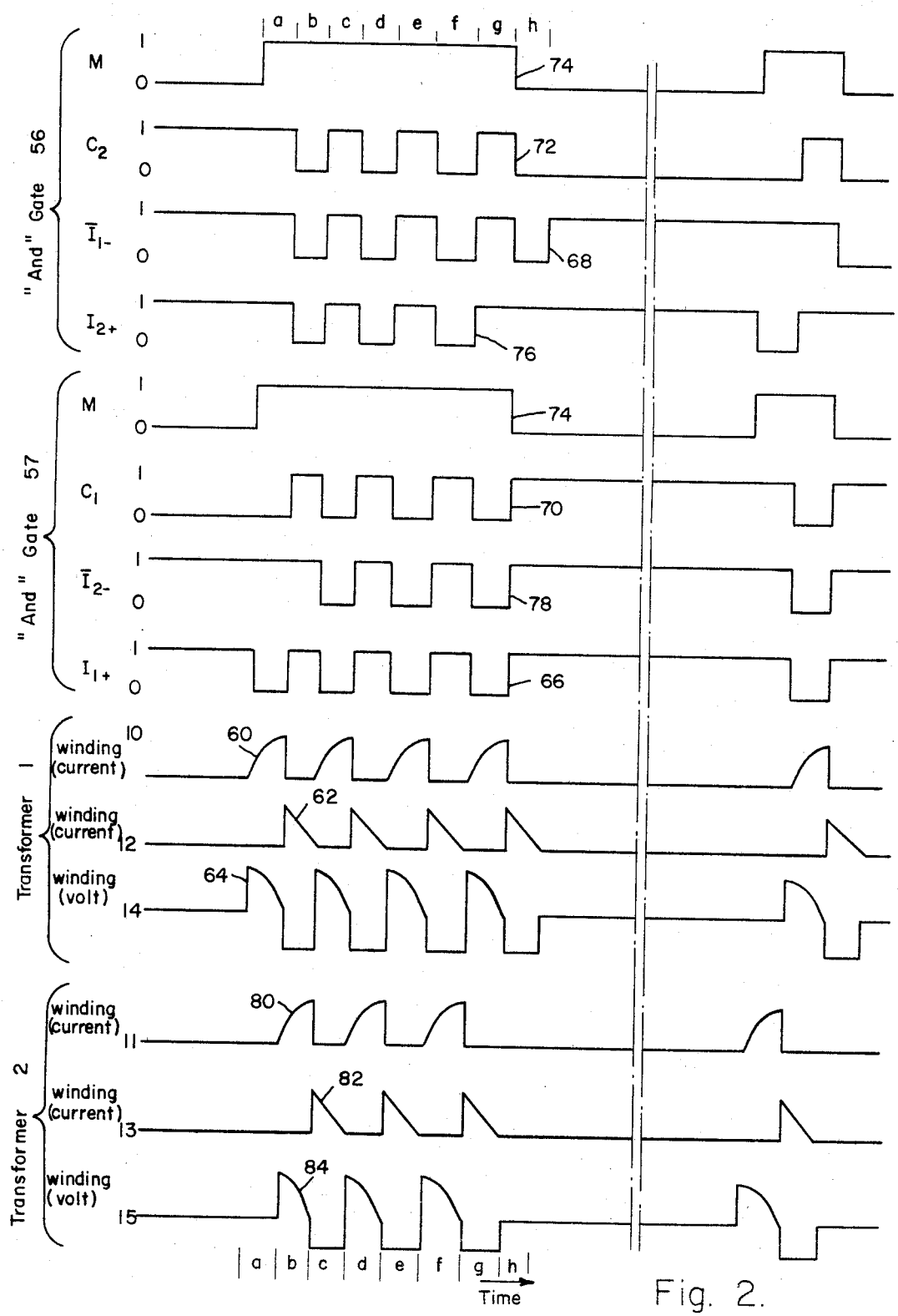
FIG. 2 illustrates typical voltage and current waveforms of the apparatus of FIG. 1.

Closing of the switching transistor 21 allows the capacitor 25 to discharge through the winding 10 of transformer 1. This discharge increases sinusoidally and is illustrated by the waveform 60, FIG. 2. During this discharge period (interval $a$ FIG. 2), voltages of like polarity are developed across the windings 12, 14 of transformer 1. Diode 26 in series with winding 12 prevents current from flowing in winding 12 during this period, as shown by a waveform 62, FIG. 2 illustrating current flow through winding 12. Winding 14, on the other hand, is essentially at open circuit and hence only develops a voltage thereacross in response to current flow through the winding 10 or 12. The voltage developed across winding 14 is illustrated by a waveform 64, FIG. 2. As the discharge from capacitor 25 reverses polarity, the magnetic field built up by the current flow commences to collapse, thereby producing a negative voltage across the windings 10, 12, 14 of transformer 1. The negative voltage across winding 10 is applied through the diode 44 to the base 23 of transistor 21 thereby to assist in cutting off current flow through this winding and transfer the energy in the magnetic field to the winding 12 in the form of current flow through diode 26 to the output terminal 28. This current through winding 12 has been found to decrease linearly with the collapse of the magnetic field whereby the voltage across sense winding 14 remains substantially constant if $V_o$ is constant. See waveforms 62, 64, FIG. 2, intervals $b$, $d$, $f$ and $h$.

As shown by the waveform 64 the voltage across winding 14 of transformer 1 during the discharge of capacitor 25 through winding 10 (intervals $a$, $c$, $e$ and $g$) is positive and during the collapse of the magnetic field produced by this discharge (intervals $b$, $d$, $f$ and $h$) the voltage across winding 14 is negative. The output voltage from winding 14 is applied to level detectors 32, 34. During the intervals $a$, $c$, $e$ and $g$ the voltage across winding 14 is positive, the signal $I_{1+}$ produced at the output of level detector 32 is at information level whereby the signal $\bar{I}_{1+}$ at the output of inverter 36 is at zero level. In that this signal $\bar{I}_{1+}$ constitutes an input to the "and" gate 57, the current driver 41 cannot be turned on during the intervals $a$, $c$, $e$ and $g$ that the capacitor 25 is discharging. In addition to the foregoing, the voltage across winding 14 is applied to the level detector 34 which generates an information level signal when the voltage applied thereto is less than 0.1 volt. Thus, during the intervals $b$, $d$, $f$ and $h$ that the magnetic field is collapsing in transformer 1, the signal $I_{1-}$ at the output of level detector 34 is at information level, whereby the signal $\bar{I}_{1-}$ at the output of inverter 38 is at zero level. Since the signal $\bar{I}_{1-}$ constitutes an input to the "and" gate 56, the current driver 40 is turned off at the commencement of the collapse of the magnetic field in transformer 1. Thus, the current driver 40 is turned off simultaneously with the appearance of a negative voltage across diode 44 to stop the current flow through switching transistor 21 at the end of the discharge from capacitor 25. At the time current driver 40 is turned off, a pulse is generated on the output lead 46 therefrom which is applied through the "or" gate 48 to set the ring counter 50 to the next position, whereby the information level signal on lead 52 is transferred to lead 51, thus setting up capacitor 26 to discharge next. The $\bar{I}_{1+}$, $\bar{I}_{1-}$ signals are shown as waveforms 66, 68, FIG. 2. In addition, the count 1 and count 2 signals appearing on the output leads 51, 52 respectively, of ring counter 50 are designated $C_1$ and $C_2$ and are shown as waveforms 70, 72, FIG. 2. Also, the output voltage of voltage controlled multivibrator 55 is designated as M and shown as waveform 74, FIG. 2.

Referring to transformer 2, prior to any discharge of capacitor 26, the voltage appearing across output winding 15 is substantially zero. During this period, the signals $I_{2+}$ and $I_{2-}$ at the outputs of level detectors 33, 35 are both at zero level whereby the signals $\bar{I}_{2+}$ and $\bar{I}_{2-}$ at the outputs of inverters 37, 39 are at information level. The signals $\bar{I}_{2+}$ and $\bar{I}_{2-}$ are illustrated as waveforms 76, 78, FIG. 2. The intervals during the capacitor 25 discharges through winding 10 of transformer 1 are designated $a$, $c$, $e$ and $g$ and the intervals during the discharge of capacitor 26 through winding 11 of transformer 2 are $b$, $d$, $f$ and $h$ where intervals $a$, $b$, $c$, $d$, $e$, $f$ and $g$ are the time during which the signal M is at information level. During interval $b$ all of the signals applied to the "and" gate 57 are at information level (see waveforms 66, 70, 74, 78, FIG. 2) whereby the current driver 41 is turned on. This allows capacitor 26 to be discharged through winding 11 of transformer 2 in the same manner as described for the capacitor 25 through winding 10. As the magnetic field developed in transformer 2 commences to collapse the energy thereof is transformed into current flow from winding 13 through diode 27 to the output circuit. Simultaneously with this, sense winding 15 generates a negative voltage, whereby the $\bar{I}_{2-}$ reverts to zero level, thereby turning off current driver 41. Since the signal $\bar{I}_{2+}$ reverts to information level as soon as the discharge from capacitor 26 has been completed (see interval $c$, waveform 76, FIG. 2) the discharge of capacitor 25 can commence as soon as the count 2 signal $C_2$ is applied to the "and" gate 56. At the time current driver 41 is turned off, a pulse is generated on lead 47 which is applied through "or" gate 48 to ring counter 50 to again apply an information level signal to "and" gate 56. See waveform 72, interval $C_1$, FIG. 2. This process repeats itself until the signal M reverts to zero level and commences again when the signal M reverts to information level. In instances where more than two discharge capacitors 25, 26 are used, the ring counter will have an output for each such discharge capacitor and will activate the "and" gates corresponding thereto in sequence. Waveforms 80, 82, 84, FIG. 2, illustrate current flow through windings 11, 13 and voltage across winding 15 of transformer 2. Thus, the control apparatus described above, and shown within the dashed lines of FIG. 1 alternately causes the capacitors 25, 26 to discharge so long as the signal M at the output of voltage controlled multivibrator 55 is at information level. Since this is determined by the control voltage $V_{c1}$, which, in turn is determined by deviations of the input voltage from the reference voltage, $V_{REF}$, the output voltage $V_{o1}$, will regulate at the voltage determined by $V_{REF}$.

Figure 3:
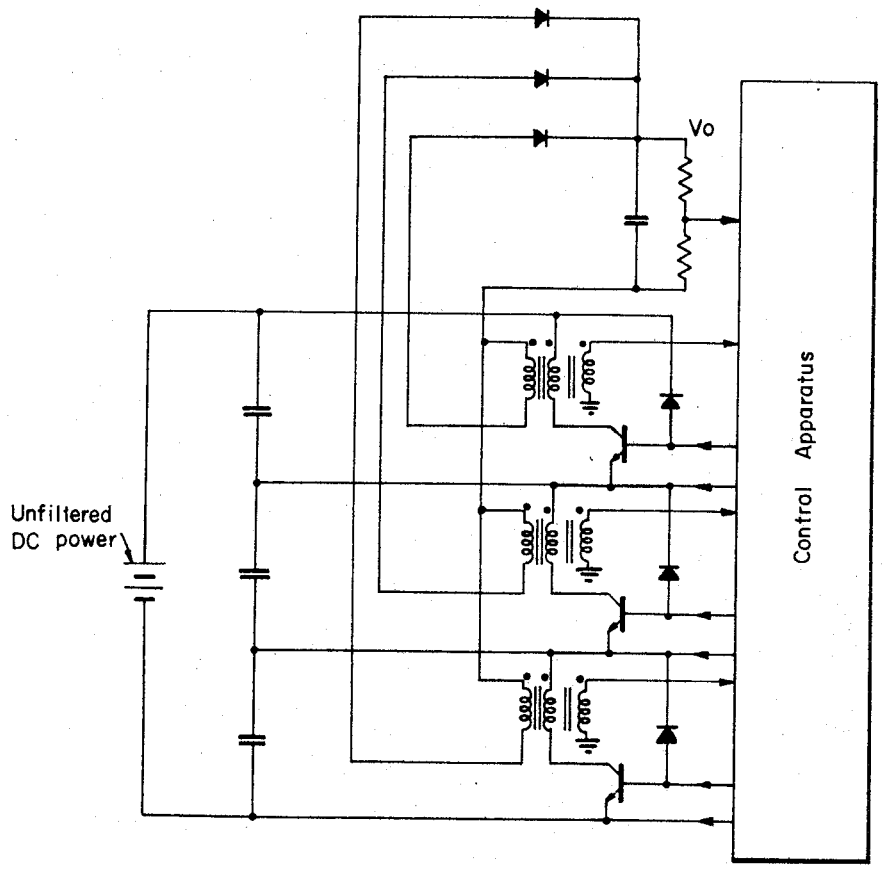
FIG. 3 shows a diagram of the invention wherein three transformers are series-parallel connected.
Figure 4:
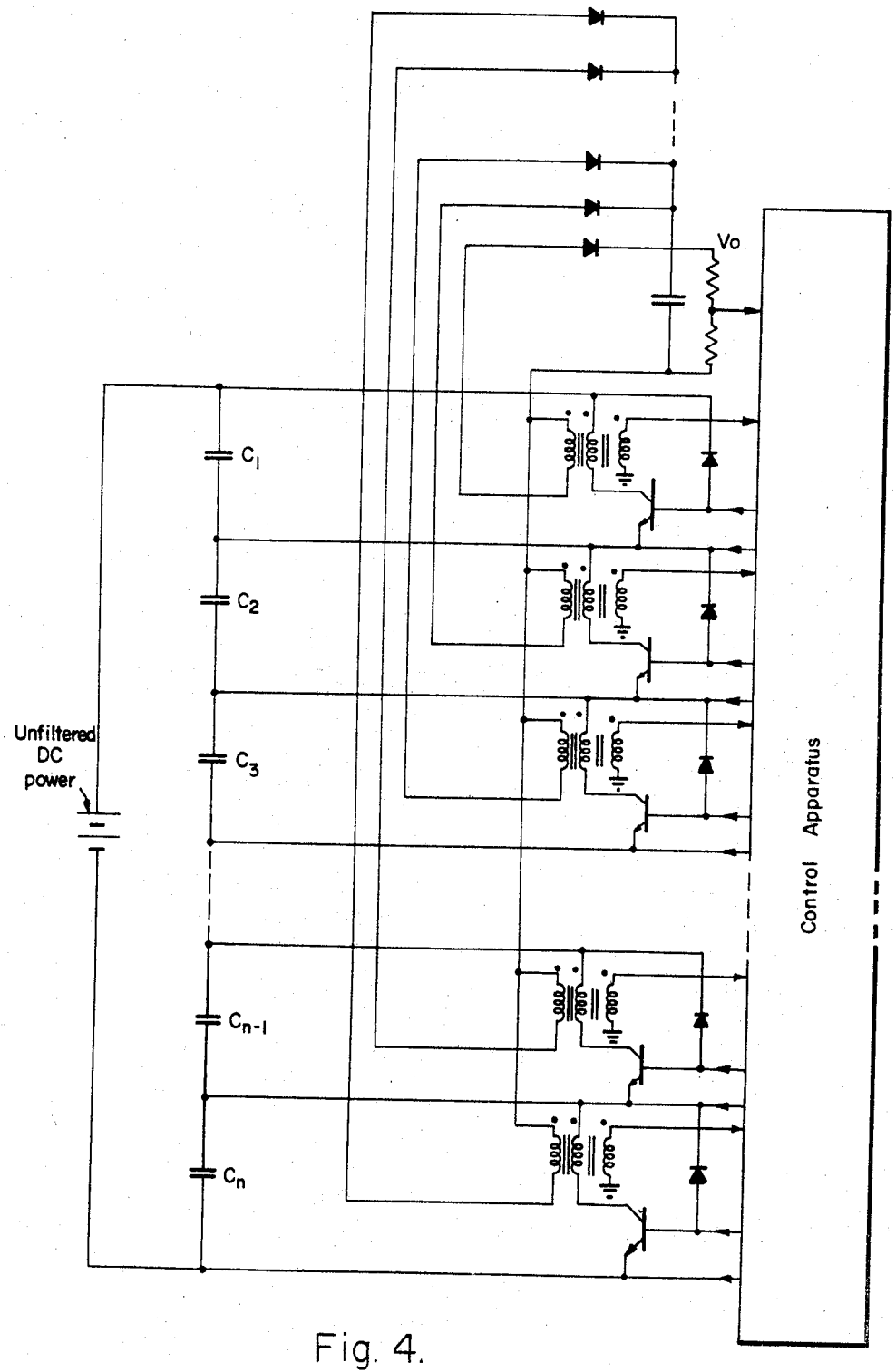
FIG. 4 shows a diagram of the invention wherein $n$ transformers are series-parallel connected, $n$ being a positive integer no less than two.

In the operation of the power supply of FIG. 1, it is apparent that the discharge of a capacitor 25 or 26 will immediately terminate the transfer of energy to the output circuit. In addition, it can be shown that the maximum voltage across the serially connected capacitors and the switches corresponding there is $2V_{s/n}$ where $V_s$ is the source voltage and $n$ is the number no less than two, of serially connected capacitors. Thus, the ripple in the output circuit and the maximum voltage that the individual switches are subjected to may be decreased by increasing the number of serially connected capacitors. Referring to FIG. 3, there is shown a power supply with three serially connected capacitors connected with associated transformers and switched in the manner shown in connection with FIG. 1. In this situation, the ring counter included in the control apparatus would include three count positions, i.e., one for each of the serially connected capacitors. Referring to FIG. 4, there is shown a power supply with $n$ serially connected capacitors, where $n$ is no less than two connected with transformers and switches in the manner described in connection with the apparatus of FIG. 1. Again, in this case, the ring counter in the control apparatus would have $n$ count positions, one for each of the serially connected capacitors. The capacitors are discharged in the same order time after time but need not be discharged in sequence.

What is claimed is:

1. An energy transformation apparatus for converting direct current power from a source providing a first voltage level into direct current power at a second predetermined voltage level across an output load impedance, said apparatus comprising a plurality of like capacitors serially connected across said source of direct current power; a first inductive winding and a switch serially connected across each of said like capacitors; a second inductive winding corresponding to and mutually coupled to each of said first inductive windings and a unidirectionally conducting device serially connected across said output load impedance, said second winding and said unidirectionally conducting device being poled to prevent current flow therethrough concurrently with current flow through said first winding mutually coupled thereto; and means coupled to said switches for discharging said capacitors through the respective first inductive windings connected thereacross in a predetermined sequence and at a rate to allow each of said capacitors to discharge prior to the discharge of the next capacitor in said sequence.

2. The energy transformation apparatus for converting direct current power at a first voltage level into direct current power at a second predetermined voltage level across an output load impedance as defined in claim 1 including means responsive to said second predetermined voltage level for interrupting said discharging of said capacitors to maintain the voltage across said output load impedance at said second predetermined voltage level.

3. An energy transformation apparatus for converting direct current power from a source providing a first voltage level into direct current power at a second predetermined voltage level across an output load impedance, said apparatus comprising first and second capacitors serially connected across said source providing a first voltage level; first and second transistors, each having a collector, an emitter and a base; first and second transformers, each having primary and secondary windings, said primary winding of said first transformer being connected serially through said first transistor across said first capacitor and said primary winding of said second transformer being connected serially through said second transistor across said second capacitor; first and second diodes, said secondary winding of said first transformer being serially connected with said first diode across said output load impedance and said secondary winding of said second transformer being serially connected with said second diode across said output load impedance, said first diode and said secondary winding of said first transformer being poled to prevent current flow therethrough concurrently with current through said primary winding of said first transformer, said second diode and said secondary winding of said second transformer being poled to prevent current flow therethrough concurrently with current through said primary winding of said second transformer and said first and second diodes being poled in the same direction relative to said output load impedance; and means coupled to said first and second transistors for alternately discharging said first and second capacitors thereby to develop said second predetermined voltage level across said output load impedance.

4. An energy transformation apparatus for converting direct current power from a source providing a first voltage level into direct current power at a second predetermined voltage level across an output load impedance as defined in claim 3 wherein an extremity of said primary winding of said first and second transformer are connected to said collectors of said first and second transistors, respectively, and said apparatus additionally includes a third diode connected from said base of said first transistor to the remaining extremity of said primary winding of said first transformer, said third diode being poled to prevent current flow therethrough during discharge of said first capacitor; and a fourth diode connected from said base of said second transistor to the remaining extremity of said primary winding of said second transformer, said fourth diode being poled to prevent current flow therethrough during discharge of said second capacitor.

5. An energy transformation apparatus for converting direct current power from a source providing a first voltage level into direct current at a second predetermined voltage level across an output load impedance, said apparatus comprising first, second, . . . $m$ . . . ($n-1$), and $n$ capacitors of like capacitance serially connected across said source providing a first voltage level wherein $n$ is a positive integer no less than 2 and $m$ is successively every positive integer from one to $n$; first, second . . . $m$ . . . ($n-1$) and $n$ electrically controllable switches; first, second, . . . $m$ . . . ($n-1$) and $n$ transformers each having primary and secondary windings, the primary winding of said $m$th transformer being serially connected with said $m$th capacitor; first, second, . . . $m$ . . . ($n-1$) and $n$ diodes, the secondary winding of said $m$th transformer being connected in series with said $m$th diode across said output load impedance, said 1, 2 . . . ($n-1$) and n diodes being poled in a consistent direction and said $m$th diode being poled to prevent current flow therethrough concurrently with current flow through said primary winding of said $m$th transformer; and means coupled to said first, second . . . ($n-1$), $n$ switches for successively discharging said first, second . . . ($n-1$), $n$ capacitors through respective primary windings of said first, second . . . ($n-1$), $n$ transformers in a predetermined sequence.

6. The energy transformation apparatus for converting direct current power at a first voltage level into direct current power at a second predetermined voltage level across an output load impedance as defined in claim 5 including means responsive to said second predetermined voltage level for interrupting said discharging of said first, second . . . ($n-1$), $n$ capacitors to maintain the voltage across said output load impedance at said second predetermined voltage level.

References Cited

UNITED STATES PATENTS

| | | | |
|---|---|---|---|
| 3,439,251 | 4/1969 | Schaefer | 321—2 XR |
| 3,443,194 | 5/1969 | Cielo | 321—2 |
| 3,443,195 | 5/1969 | Hoffman | 321—2 |

LEE T. HIX, Primary Examiner

W. M. SHOOP, Jr., Assistant Examiner

U.S. Cl. X.R.

321—15, 18, 45